(12) United States Patent
Goodman

(10) Patent No.: US 7,051,326 B2
(45) Date of Patent: May 23, 2006

(54) CODE IMAGE DISTRIBUTION IN A MULTI-NODE NETWORK OF PROCESSORS

(75) Inventor: Brian Gerard Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/734,917

(22) Filed: Dec. 13, 2000

(65) Prior Publication Data

US 2002/0073413 A1 Jun. 13, 2002

(51) Int. Cl.
*G06F 9/44* (2006.01)

(52) U.S. Cl. .................... 717/172; 717/171; 717/173; 717/177; 709/223

(58) Field of Classification Search ............... 717/103, 717/177, 149–178; 709/221, 208, 203, 223; 713/1, 300, 320; 714/776, 15; 345/179; 710/126
See application file for complete search history.

(56) References Cited

U.S. PATENT DOCUMENTS

| | | | | |
|---|---|---|---|---|
| 5,483,656 | A * | 1/1996 | Oprescu et al. ............. | 713/320 |
| 5,550,997 | A | 8/1996 | Ip et al. ...................... | 395/430 |
| 5,623,604 | A * | 4/1997 | Russell et al. .............. | 717/167 |
| 5,752,046 | A * | 5/1998 | Oprescu et al. ............. | 713/300 |
| 5,815,722 | A * | 9/1998 | Kalwitz et al. ............. | 717/178 |
| 5,826,075 | A | 10/1998 | Bealkowski et al. ........ | 395/600 |
| 5,842,027 | A * | 11/1998 | Oprescu et al. ............. | 713/300 |
| 5,999,989 | A | 12/1999 | Patel .............................. | 710/1 |
| 6,023,727 | A * | 2/2000 | Barrett et al. ................ | 709/221 |
| 6,144,992 | A * | 11/2000 | Turpin et al. ................ | 709/208 |
| 6,205,580 | B1 * | 3/2001 | Hirose .......................... | 717/162 |
| 6,266,809 | B1 * | 7/2001 | Craig et al. .................. | 717/173 |
| 6,269,396 | B1 * | 7/2001 | Shah et al. .................. | 709/223 |
| 6,308,325 | B1 * | 10/2001 | Dobbek ....................... | 717/178 |
| 6,401,198 | B1 * | 6/2002 | Harmer et al. ................. | 713/1 |
| 6,457,175 | B1 * | 9/2002 | Lerche ........................ | 717/173 |
| 6,601,212 | B1 * | 7/2003 | Guha et al. .................. | 714/776 |
| 6,625,754 | B1 * | 9/2003 | Aguilar et al. ................. | 714/15 |
| 2001/0018721 | A1 * | 8/2001 | McKenna et al. .......... | 710/126 |
| 2002/0073304 | A1 * | 6/2002 | Marsh et al. .................. | 713/1 |
| 2002/0091763 | A1 * | 7/2002 | Shah et al. .................. | 709/203 |

(Continued)

OTHER PUBLICATIONS

Electronic Engineering, Reducing development times for embedded systems, Sep 1, 1999, p. 35.*

(Continued)

*Primary Examiner*—Wei Y. Zhen
*Assistant Examiner*—Satish S. Rampuria
(74) *Attorney, Agent, or Firm*—John H. Holcombe

(57) ABSTRACT

A multi-node processing network has a plurality of processors coupled in the network. The processors have a minimally operational state, e.g., upon being rebooted, and have a fully operational state employing a code image. The processors, when in the minimally operational state, request the code image from the network. The processors have a non-volatile memory storing code for the minimally operational state, which is sufficient to at least provide the code image request. A master source is coupled in the network, the master source having at least a code image for broadcasting on the network. The master source, upon receiving a code image request, waits a predetermined time period, the predetermined time period allowing any additional processor to reach the minimally operational state. Upon completion of the predetermined time period, the master source broadcasts the code image on the network. The processor may store the code image in volatile memory since it may easily be requested.

15 Claims, 5 Drawing Sheets

U.S. PATENT DOCUMENTS

2003/0146907 A1* 8/2003 Boals et al. ............... 345/179
2004/0031030 A1* 2/2004 Kidder et al. ............... 717/172

OTHER PUBLICATIONS

Corcoran, Cate, PC makers look beyond RISC to faster VLIW systems, Jan 17, 1994, InfoWorld, vol. 16, issue 3, p. 29.*

Antonio et al., Designing distributed applications with mobile code paradigms, May 1997, ACM, Proceedings of the 19th international conference on Software engineering, pp. 22-32.*

Franz, Run-time code generation as a central system service, IEEE, May 5-6, 1997 Page(s):112-117.*

Grigoras et al., A framework for component-based distributed applications design. The CODE: Component Oriented Distributed Environment, IEEE, Aug. 27-30, 2000 Page(s):8-12.*

Takahashi et al., A programming interface for network resource management, IEEE, Mar. 26-27, 1999 Page(s):34-44.*

* cited by examiner

CODE IMAGE DISTRIBUTION IN A MULTI-NODE NETWORK OF PROCESSORS

FIELD OF THE INVENTION

This invention relates to multi-node networks of embedded systems employing processors, each processor operating in accordance with a code image, and, more particularly, to insuring that each processor of the network has its code image, for example, when the processor or the network is powered on.

BACKGROUND OF THE INVENTION

Typically, each processor of a multi-node network of embedded systems employing processors has a high speed RAM (Random Access Memory) for storing a code image which, when executed, operates the processor. An example of an embedded system having a plurality of modules with processors at nodes of the system, comprises an automated data storage library, which stores removable data storage media in storage shelves, which has a plurality of data storage drives to read and/or write data on the data storage media, and which has at least one robot to transport the data storage media between the storage shelves and the data storage drives, with processors at the modules to operate the library, and with a network to couple the modules of the embedded library system. Such a library system may comprise a hundred or more data storage drive processors and tens of library processors. It can become a real challenge to maintain consistent code levels in a network of a large number of nodes.

Some multi-node networks, such as LANs (Local Area Networks), are employed for coupling together a number of like components, such as PCs (Personal Computers), with peripheral devices, such as printers. In at least one instance, such as discussed by U.S. Pat. No. 5,815,722, executable code files for the specific devices may be updated by downloading directly to RAM. In the patent, a communication program operates to broadcast an inquiry on the LAN to a specific network board, to receive location information of the designated board, e.g., of a printer. The executable file is then directly downloaded into RAM on the designated board through the LAN. However, to prevent loss of the executable code when any of the devices or boards is powered off, the RAM is non-volatile (called NVRAM).

The executable code for printers and similar devices is exceptionally small, requiring only a very small NVRAM. In more major systems, such as automated data storage libraries, a module processor may comprise a processor of the power of a workstation or PC, and the executable code for each module processor is quite large.

As a result, typically, each processor of a multi-node network has a PROM (Programmable Read-Only Memory) or a ROM (Read-Only Memory), which stores a power-on sequence, and which must store a copy of the code image to prevent loss. A power-on sequence for any of the modules of an embedded system involves the execution of power-on code that is stored in the PROM or ROM device, where a module may comprise an assembly, subassembly or a circuit board. The code may first test the components of the module, and then may transfer the code image to the faster RAM.

Thus, the need for both NVRAMs, PROMs or ROMs and a fast RAM is very expensive. The requirement that a PROM or ROM have sufficient capacity to store the code image for the associated RAM, or that a NVRAM be used, adds significantly to the expense of each module. When multiplied by a high number of modules, the expense can become a significant factor in the cost of the full system. Further, should a code image be updated, failures of the update process are not uncommon, for example, if power is lost during a code update, and may even cripple the node entirely.

SUMMARY OF THE INVENTION

An object of the present invention is to eliminate the need for a large NVRAM, PROM or ROM.

Another object of the present invention is to provide code images to processors of a multi-node processing network, for example, when the processor or the network is powered on, without requiring a high capacity NVRAM, PROM or ROM.

Disclosed are a multi-node processing network, method, and computer program product, with a plurality of processors coupled in the network. The processors have a minimally operational state, e.g., upon being rebooted, and have a fully operational state employing a code image.

In accordance with the present invention, the processors, when in the minimally operational state, request the code image from the network. The processors may have a non-volatile memory storing code for the minimally operational state which is sufficient to at least provide the code image request. A master source is coupled in the network, the master source having at least a code image for broadcasting on the network. The master source, upon receiving a code image request, waits a predetermined time period, the predetermined time period allowing any additional processor to reach the minimally operational state. Upon completion of the predetermined time period, the master source broadcasts the code image on the network.

In another aspect of the present invention, the processors, additionally, upon the broadcast of the code image, receive and implement the code image only if the processor is in the minimally operational state.

Thus, without requiring a high capacity NVRAM, PROM or ROM at each processor, the present invention provides code images to processors of a multi-node processing network, but does not interrupt a currently operating processor.

A code image for the processors may be updated by first updating the master source, and rebooting all of the processors that are on the network and, upon being rebooted, the processors will request the code image, and the master source will supply the updated code image. In another aspect of the present invention, in which the processors are provided for modules of a redundant system having at least two sets of redundant modules, at least one set of redundant modules is rebooted, such that the processors of the modules reach the minimally operational state and request the code image from the network. The redundant modules may comprise all or part of the nodes in the complete system, and may comprise as little as a single node which is duplicated to be redundant. The master source, upon receiving a code image request, waits a predetermined time period, the predetermined time period allowing any additional processor to reach the minimally operational state. The master source, upon completion of the predetermined time period, broadcasts the code image on the network, such that the processors requesting the code image become fully operational. Then, a remaining set of redundant modules is rebooted, so that the processors of the modules reach the minimally operational state and request the code image from the network. The master source, upon receiving a code image request, waits a predetermined time period, the predetermined time period allowing any additional processor to reach the minimally operational state, and, upon completion of the predetermined time period, broadcasts the code image on the network, such that the processors of the remaining set of redundant modules requesting the code image become fully operational. In this manner, the code images for the entire redundant system have been updated without requiring that the operation of the entire system be interrupted.

As the result, the present invention eliminates the need to maintain and update code levels on individual processors.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
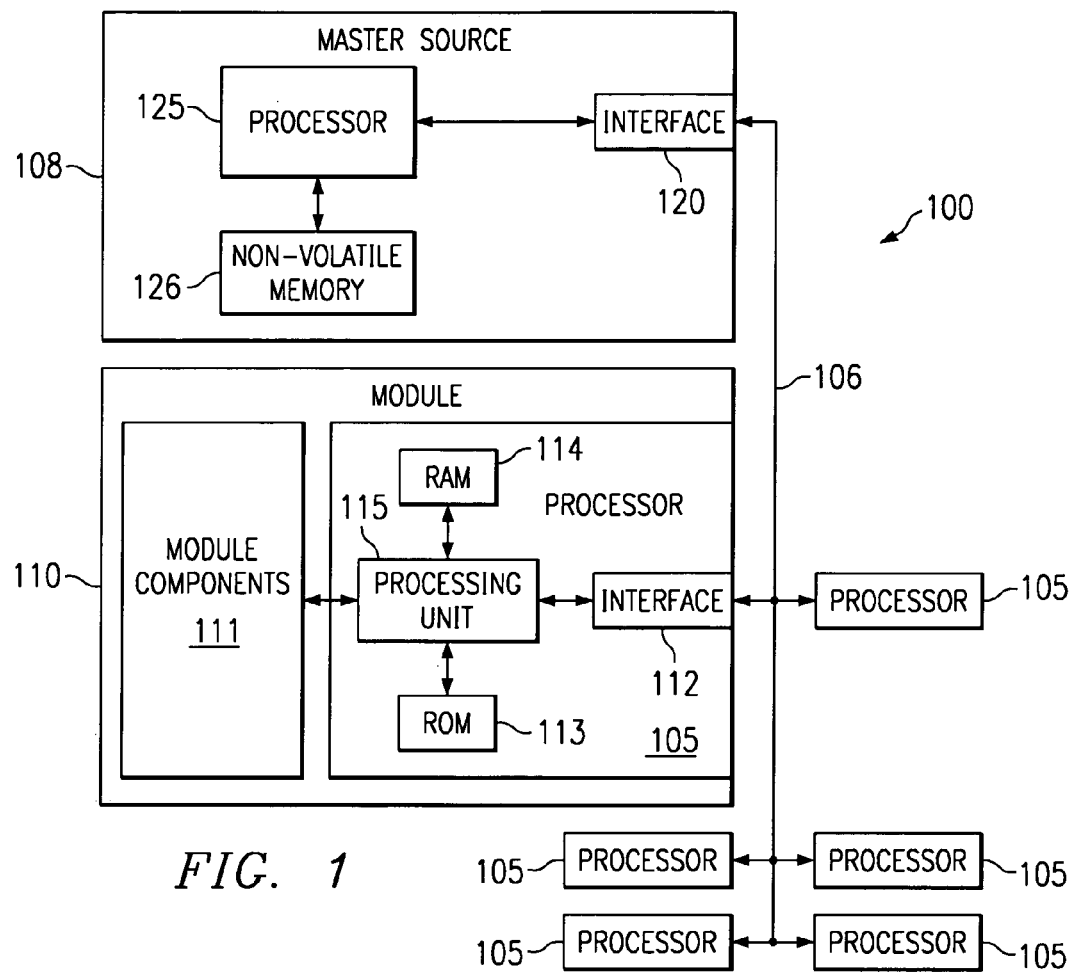
FIG. 1 is a block diagram of a multi-node processing network arranged in accordance with the present invention.

FIG. 1 illustrates a multi-node processing network system 100 with a plurality of processors 105 coupled in a network 106, together with a master source 108. An example of a network comprises a multi-node system of embedded processors. The embedded system comprises a plurality of modules with processors at nodes of the system, and the network serves to interconnect the modules 110 of the system, where the modules have programmable processors 105 to operate the modules and their components 111, thereby operating the system. In the illustrated example, the processors 105 each comprises a processor interface 112 coupling the processor in the network, a non-volatile memory 113, such as a ROM, for storing code comprising at least a boot program, a processor memory 114, such as a high speed RAM, storing a code image providing a fully operational state of the processor, and a processing unit 115 coupled to the non-volatile memory 113, the processor memory 114 and the processor interface 112.

In accordance with the present invention, the processors 105 have a minimally operational state, e.g., upon being rebooted, employing the boot program code of the non-volatile memory 113, and have a fully operational state employing a code image stored in the processor memory 114. Herein, "reboot" may comprise (a) a power-on of a processor, (b) a reset of a processor, (c) a software instruction or command to cause a processor to run its boot code, or (d) any other initialization process resulting in running the boot code.

The processor memory 114 is typically a high speed RAM that stores a code image which, when executed, operates the processor. The code image stored in the high speed RAM is lost whenever the processor is powered off. If a processor is powered off, the boot program stored in the non-volatile memory 113 becomes operational upon a power-on reset of the processor. As discussed above, the typical non-volatile memory of the prior art additionally contains the entire code image to prevent loss of the executable code when any of the modules is powered off.

Further in accordance with the present invention, the non-volatile memory 113 is of relatively small capacity, and only contains code for the minimally operational state which is sufficient to at least provide a code image request. As an example, many processors may include a flash memory 113 as an off-the-shelf product, making a separate component unnecessary. Specifically, when a processor 105 is in the minimally operational state, the processor employs the boot program to request the code image from the network 106. The master source 108 is coupled in the network, and has at least the requested code image for broadcasting on the network.

The master source 108 comprises a master interface 120 coupled in the network, a master processor 125 coupled to the master interface, and a non-volatile memory 126 coupled to the master processor 125 which stores at least the code image for the processors of the network. The master source may also comprise a functional node of the network with a RAM, module components, etc. In accordance with the present invention, upon receiving a code image request from a processor 105 at the master interface 120, the master source 108 waits a predetermined time period, the predetermined time period allowing any additional processor 105 to reach the minimally operational state, and, upon completion of the predetermined time period, the master source 108 broadcasts the code image stored in the non-volatile memory 126, via the master interface 120, on the network 106. The predetermined time period may be renewed or extended, as is discussed hereinafter.

Thus, without requiring a high capacity NVRAM, PROM or ROM at each processor for storing the entire code image, the present invention provides code images to processors of a multi-node processing network.

In another aspect of the present invention, the processors 105, upon the broadcast of the code image by the master source, receive and implement the code image only if the processor is in the minimally operational state. In this manner, no running fully operational processor is interrupted or disrupted to interject a new code image.

Figure 2:
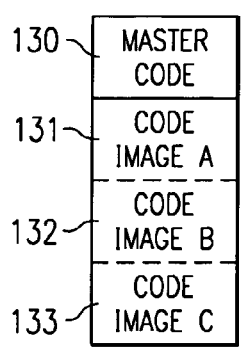
FIG. 2 is a diagrammatic representation of the code stored at a master source of the network of FIG. 1.

Referring additionally to FIG. 2, the processors 105 of a multi-node network of embedded systems 100 are associated with modules that perform various functions in the system. Thus, the processors may employ correspondingly different code images. As the result, the master source 108 of the present invention may be required to store multiple code images. An example of the code stored in non-volatile memory 126 of master source 108 is depicted in FIG. 2, and comprises a code image 130 for operating the master source 108 and other code images 131–133 for operating the various processors 105. A code image may comprise a computer program product usable with a programmable computer, the computer program product having computer readable program code embedded therein.

In the instance where the master source 108 also comprises a functional node of the network, in one alternative, code image 130 may comprise both the master source code and the functional node code. In another alternative, the code image 130 may comprise the master source code, and one of the code images 131–133 may comprise the functional node code. A redundant master source 108 may also be provided and may have the same, a different, or no functional node code.

The master source may distribute the code images 131–133 either by 1) providing and broadcasting one code image for any code image request, where the one master source code image comprises a combination of the different code images 131–133, or by 2) selecting and broadcasting only the requested one of the different code images. In the event of a dual master source, code image 130 may also be broadcast, or separate master source and module function code images may be provided and broadcast. For example, one master source may be mounted at a module of a first type and the dual master source at a module of a second type, and another module function may be a processor 105. Where the one broadcast master source code image comprises a combination of different code images, the processors 105 additionally select and implement one of the combination of different code images, specifically, the code image that is correct for the processor. Where the master source 108 selects the desired code image 131–133 in response to a specific request, and broadcasts the selected code image, each of the requesting processors 105 determines whether the broadcast code image is correct for the requesting processor, and the requesting processor selects the broadcast code image for implementation if the determination is that the code image is correct for the processor. A dual master may also request and receive a code image 130. Alternatively, all processors 105 may use one common code image, since they contain many common code elements, but each processor can sense node type and not execute some portions of the code.

Figure 3:
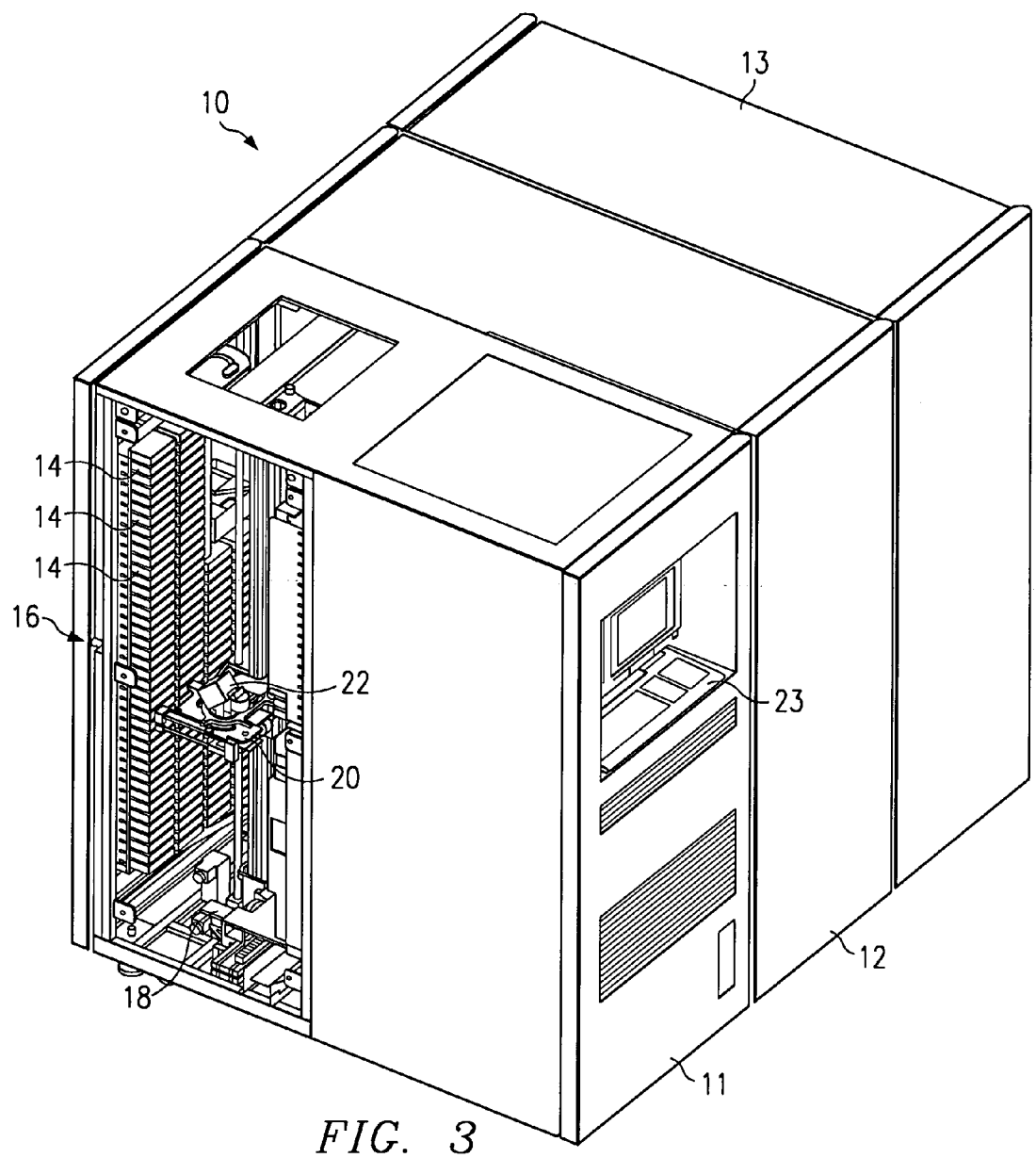
FIG. 3 is an isometric view of an automated data storage library employing the network of FIG. 1.
Figure 4:
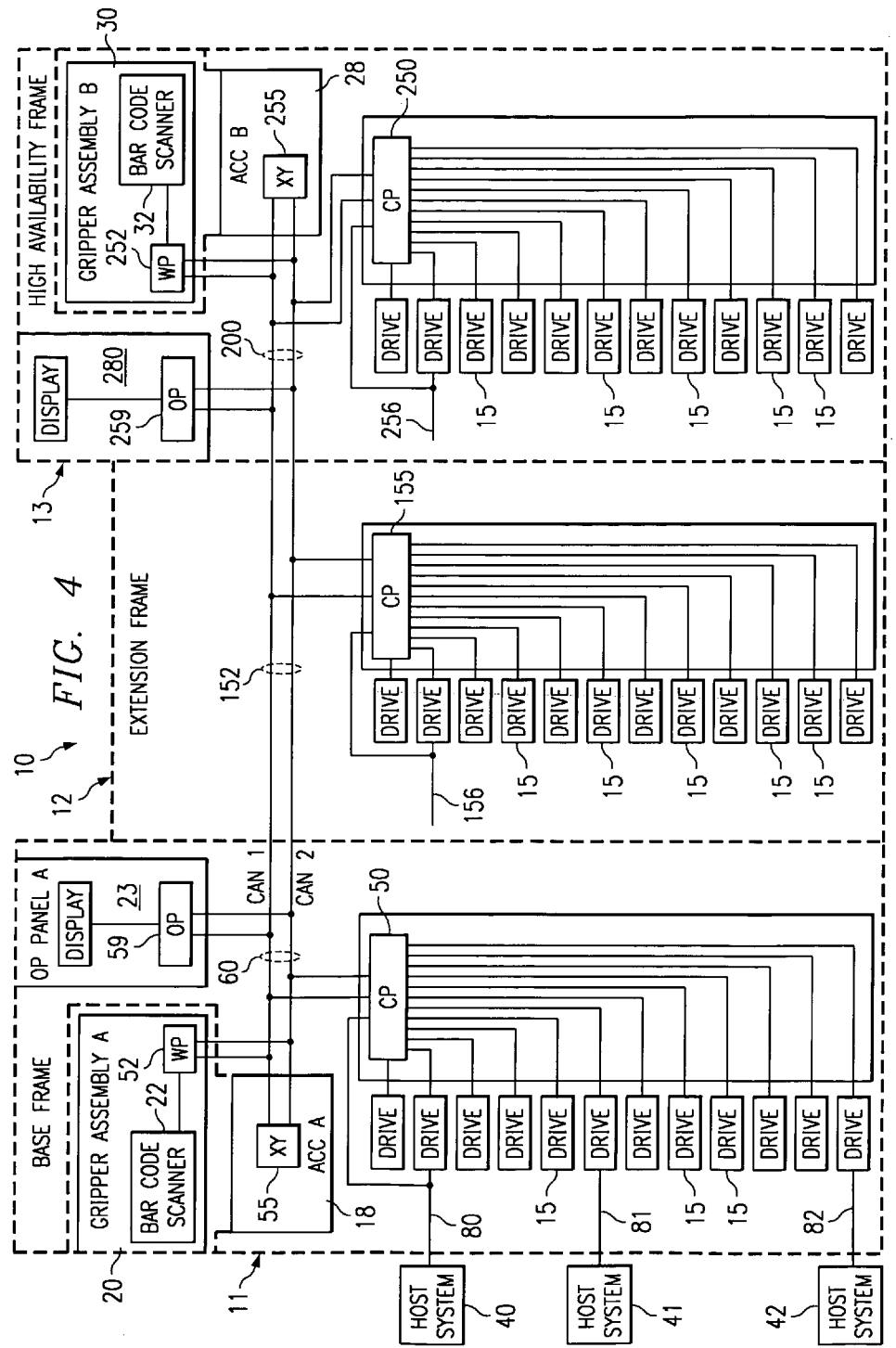
FIG. 4 is a block diagram of the automated data storage library of FIG. 3.

Referring to FIGS. 3 and 4, an example of an embedded system having a plurality of modules with processors at nodes of the system, comprises an automated data storage library 10, which stores removable data storage media 14 in storage shelves 16. An example of an automated data storage library is the IBM 3494 Tape Library Dataserver. The exemplary library comprises a base frame 11, may additionally comprise one or more extension frames 12, and may comprise a high availability frame 13. The base frame 11 of the library 10 comprises a plurality of data storage drives 15 to read and/or write data on the data storage media, and has a robot accessor 18 to transport the data storage media between the storage shelves and the data storage drives. The robot 18 includes a gripper assembly 20 and may include a bar code scanner or reading system 22 to read identifying information about the data storage media 14. The library may also comprise an operator panel 23 or other user interface which allows a user to interact with the library.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and may include a bar code scanner 32 or other reading device, and an operator panel 280 or other user interface. In the event of a failure or other unavailability of the robot accessor 18, or its gripper 20, etc., the second robot accessor 28 may take over. Additionally, both robot accessors may operate simultaneously in different sections of the library to speed storage and retrieval of the data storage media.

The library 10 receives commands from one or more host systems 40, 41 or 42. The host systems, such as host servers, communicate with the library, either directly on path 80, or through one or more data storage drives 15 on paths 81 or 82. The paths 80, 81 or 82 may, for example, comprise SCSI busses or fiber channel arbitrated loops.

The embedded system comprises processors at the modules to operate the library, with a network to couple the modules of the embedded library system. Such a library system may comprise a hundred or more data storage drive processors and tens of library processors. Thus, the embedded system may comprise communication processor nodes 50, 155, and 250 to receive commands from the hosts and convert the commands to physical movements of the robot accessors 18, 28. The communication processor nodes 50, 155, and 250 may also provide a communication link for operating the data storage drives 15. Work processor nodes 52 and 252 are located at the respective robot accessor 18 and 28, and respond to host commands received from the communication processor nodes and direct the operation of the accessor, providing XY move commands. The work processor nodes are also coupled to the respective scanners 22, 32. XY processor nodes 55 and 255 are located at an XY system of the accessor and respond to the XY move commands, operating the XY system to position the grippers 20, 30 to access the media.

Also, operator panel processor nodes 59, 259 may be provided at the respective operator panels 23, 280 for providing an interface for communicating between the operator panel and the communication processor nodes 50, 155, and 250, the work processor nodes 52, 252, and the XY processor nodes 55, 255.

The network comprises base frame common bus 60, coupling the communication processor node 50, the operator panel processor node 59, the work processor node 52, and the XY processor node 55. The extension frame 12 is coupled by an extension common bus 152 to the base frame common bus 60. The communication processor node 155 is coupled to the extension common bus 152, and communicates with both data storage drives 15 and with hosts, either directly or indirectly, at input 156. Additional extension frames employing identical communication processor nodes 155, storage shelves 16, data storage drives 15, and extension busses 152, may be provided, and each is coupled to the adjacent extension frame. The high availability frame 13 comprises an extension common bus 200 coupled to the extension common bus 152 of an extension frame or, if there is no extension frame, to the common bus 60 of the base frame. The high availability frame extension common bus 200 couples the communication processor node 250, which is coupled to the data storage drives 15 and may receive commands from hosts at input 256, to the work processor node 252, to the operator panel processor node 259, and to the XY processor node 255.

Thus, each of the processor nodes is coupled to the common busses 60, 152, 200 to form a network.

The common busses 60, 152, 200 may comprise a wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Each of the extension common busses 152, 200 may comprise a flex cable connection to the preceding adjacent common bus. Other similar bus networks may be employed for implementing the present invention. Alternatively, the common busses 60, 152, 200 may comprise a wireless network system, such as RF or infrared, as is known to those of skill in the art.

The processors coupled to the network may comprise a processor of the power of a workstation or PC, in the case of the communication processor nodes 50, 155, 250, the work processor nodes 52, 252, the XY processor nodes 55, 255, and each of the drives 15, and the code image for each module processor may be quite large. Also, each of the operator panel processor nodes 59, 259 may comprise a module processor requiring a code image, or may comprise a separate processing system. Further, each of the types of modules conduct different jobs, potentially requiring different code images.

Referring to FIG. 1, when a module 110 or its processor 105 is repaired, replaced or upgraded, it must be powered off, the repair, etc. work conducted, and then it is turned on, called a power-on reset. When the processor is powered off, the code image is lost from the RAM 114 and must be replaced before the processor, and therefore the module, can become operational.

Figure 5:
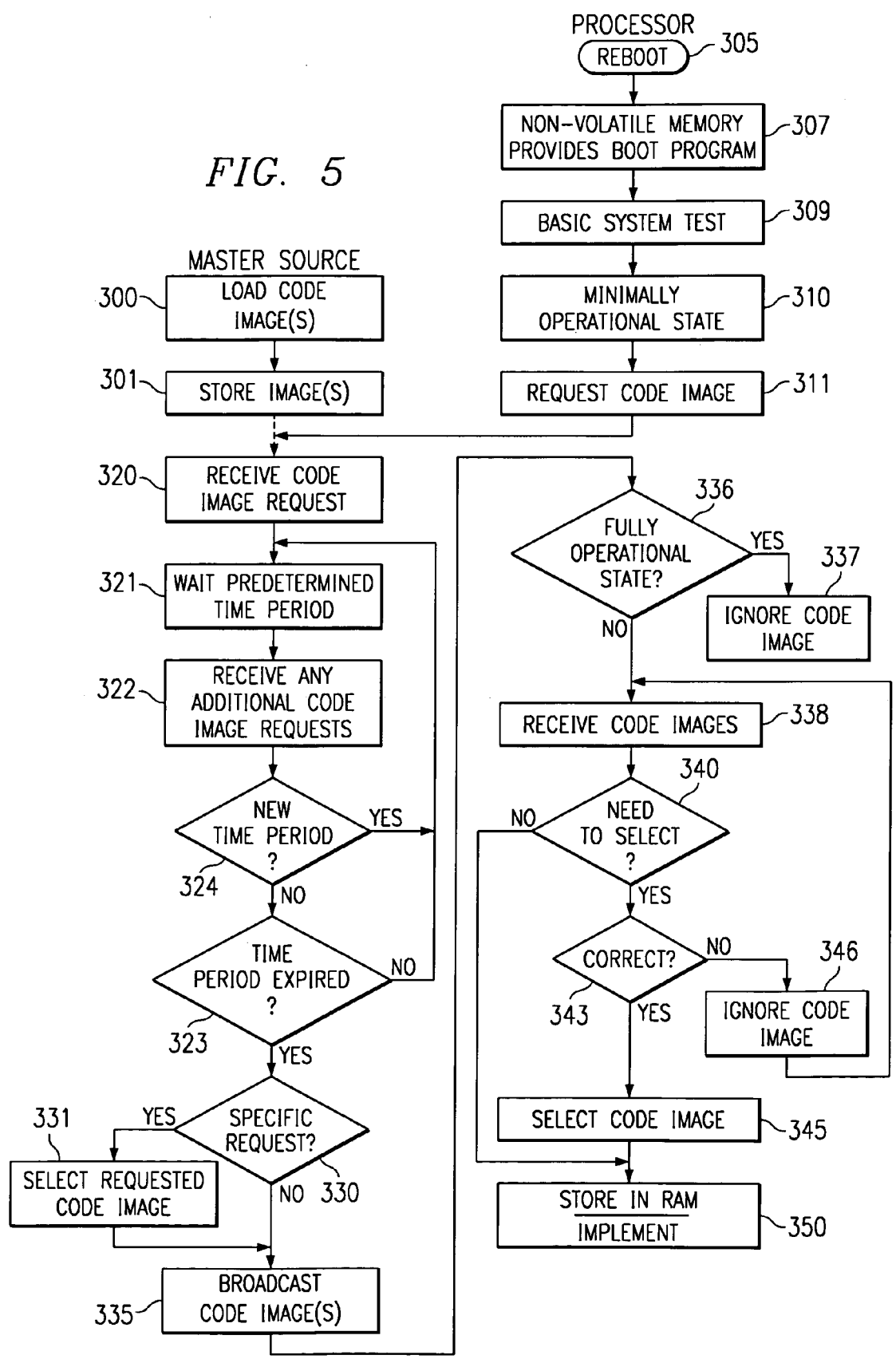
FIG. 5 is a flow chart depicting computer implemented embodiments of the method of the present invention for distributing code images in a network system.

Referring additionally to FIG. 5, the present invention provides code images to processors of a multi-node processing network without requiring a high capacity NVRAM, PROM or ROM at each processor to store the code image in the event the module is powered off.

In step 300, the code image, or code images 131–133, or code image 130 in the case a dual master, of FIG. 2, are loaded to the master source 108 and, in step 301, are stored in the non-volatile memory 126 of the master source. In FIGS. 1–5, the master source 108 may comprise any of the processors coupled to the base frame common bus 60, and may, for example, comprise the work processor node 52. The code images 131–133 each comprises the current updated code image for the corresponding processors 105. The code images are thus ready to be broadcast when requested by one or more processors.

As discussed above, a processor 105 may be rebooted, depicted as step 305, such that the boot program stored in the non-volatile memory 113 becomes operational, and is provided to the processing unit 115 of the processor 105 in step 307. In accordance with the present invention, the non-volatile memory 113 is of relatively small capacity, and only contains the boot code. The boot code may first conduct at least a basic system test which tests the components of the module, in step 309, and then places the processor 105 in the minimally operational state in step 310. The processor may previously have been powered off and subsequently powered on and is, at that time, absent a code image required to become fully operational. Then, in step 311, the processor employs the boot program to request the code image from the network 106.

The master source receives the first code image request in step 320. In accordance with the present invention, upon receiving a first code image request from a processor 105 at the master interface 120, the master source 108, in step 321, waits a predetermined time period. The predetermined time period of step 321 is sufficient to allow any additional processor 105 that might be powered on at about the same time, to reach the minimally operational state, and provide a code image request, received at step 322. The predetermined time may be fixed or variable, and may be timed from the first received request, or alternatively from the most recently received request. Thus, as an example, if several data storage drives 15 were replaced or upgraded at the same time, they could be powered on at about the same time, or a frame could be powered on and the master source 108 waits for all processors to reach the minimally operational state so that the code image will only be broadcast once.

In the event the predetermined time period is timed from the most recently received request, step 324 determines whether a new time period is required. If so, the previous time period is renewed in step 321, or, alternatively, a new predetermined time period is established in step 321, in effect extending the predetermined time period. As an example, the new predetermined time period may be shorter than the previous time period by a fixed or variable amount. If no new request is received, or if the timing is only from the first received request, the process proceeds to step 323. Step 323 determines whether the time period has expired, and, if not, continues the wait step 321.

Referring additionally to FIG. 2, as discussed above, the processors 105 of a multi-node network of embedded systems 100 are associated with modules that perform various functions in the system, and may employ correspondingly different code images. As the result, the master source 108 of the present invention may store multiple code images 131–133 for operating the various processors 105.

The master source 108 may distribute the code images 131–133 either by providing and broadcasting one code image, which may be all of the code images 131–133, for any code image request, or may optionally respond to a specific request for a specific code image. Thus, as an option, upon completion of the predetermined time period, as determined by step 323, the master source 108, in step 330, determines whether the code image request received in step 320, and any code image request received in step 322, is a specific request for one of the multiple code images 131–133. For example, an XY processor node 55, 255 may request a specific code image by accompanying the request with a specific identifier, such as an encoded number for the type of module.

If step 330 indicates that a specific code image has been requested, the master source selects that code image from non-volatile memory 126 in step 331.

The master source 108 then, in step 335, distributes the code images 131–133 either by 1) providing and broadcasting one, possibly combined, code image for the code image request, or by 2) broadcasting only the requested one of the different code images selected in step 331. A redundant master source may also request a code image 130, which is selected by master source 108 in step 331 and supplied in step 335.

The broadcast code images are supplied at the interface 112 of each of the processors 105 in step 336. In accordance with an aspect of the present invention, if the processor is in the fully operational state and running, that operation will not be interrupted or disturbed, and, in step 337, the code image is ignored and not received. If the processor is in the minimally operational state, the broadcast code image(s) are received in step 338. The code for making the determination of step 336 and conducting step 337 or step 338 may be part of the boot program of non-volatile memory 113, or part of the operational code of RAM 114.

In an optional situation where, either the master processor 108 is capable of broadcasting only a single code image in step 331 at one time, the specific code image of a first specific request for a code image of step 311, may be broadcast even though other processors requested different code images, or a single code image comprising a combination of code images 131–133 is broadcast, then, each of the processors 105 must determine whether it is receiving a correct code image. If that option is available, step 340 determines that the processor must select the correct code image. The determination whether the code image is correct, or the correct code image is included in the broadcast, is made in step 343. If the code is correct, it is selected in step 345, and, if not, it is ignored in step 346 and the process cycles back to step 338 to receive the next broadcast.

Thus, where the one broadcast code image comprises a combination of different code images, the requesting processors 105 additionally select, in step 343, the code image that is correct for the processor. Where the broadcast code image is one of the different code images 131–133 selected by the master source 108 in response to a specific request, each of the requesting processors 105 determines, in step 343, whether the broadcast code image is correct for the processor, and selects the broadcast code image for implementation if the determination is that the code image is correct for the processor.

Whether selected by step 345, or if no selection is required from step 340, the code image is stored in RAM 114 and implemented in step 350. As is known to those of skill in the art, the code image may overwrite any data previously in RAM 114. As an example, the boot program of non-volatile memory 113 may begin execution of the code image in step 350. The code for making the determinations of steps 340 and 343, the selection and ignoring steps 345 and 346, and the storage of the code image are also part of the boot program of non-volatile memory 113.

In the example of an embedded system of FIGS. 3 and 4, the master source may comprise work processor 52, and the processors which may request code images may comprise the processors associated with the data storage drives 15, or may comprise the communication processor nodes 50, 155, 250, the work processor node 252, the XY processor nodes 55, 255, or the operator panel processor nodes 59, 259. Also, a backup master source may be provided, for example, at the work processor node 252.

As the result, the present invention, without requiring a high capacity NVRAM, PROM or ROM at each processor for storing the entire code image during a power off situation, provides the correct code images to each of the requesting processors of a multi-node processing network.

In embedded systems which, for example, require continuous operation, such as an automated data storage library, the modules are preferably redundant, or "hot-swappable", so that they may be repaired, replaced or upgraded as needed without requiring turning off the entire system. In the example of FIGS. 3 and 4, the robot accessors may be redundant, such that work processor 252 contains the same code image as work processor 52, and may also comprise a backup master source, if needed. Also redundant are the XY processor nodes 55, 255. The operator panel processor nodes 59, 259, and the communication processor nodes 50, 155, 250 may also be redundant, as may the set of data storage drives 15 in each of the frames 11–13.

In a non-redundant system, a code image for the processors may be updated by a reboot of the processors that are on the network in accordance with the present invention, such that the processors will request the code image, and the master source will supply the updated code image.

Figure 6:
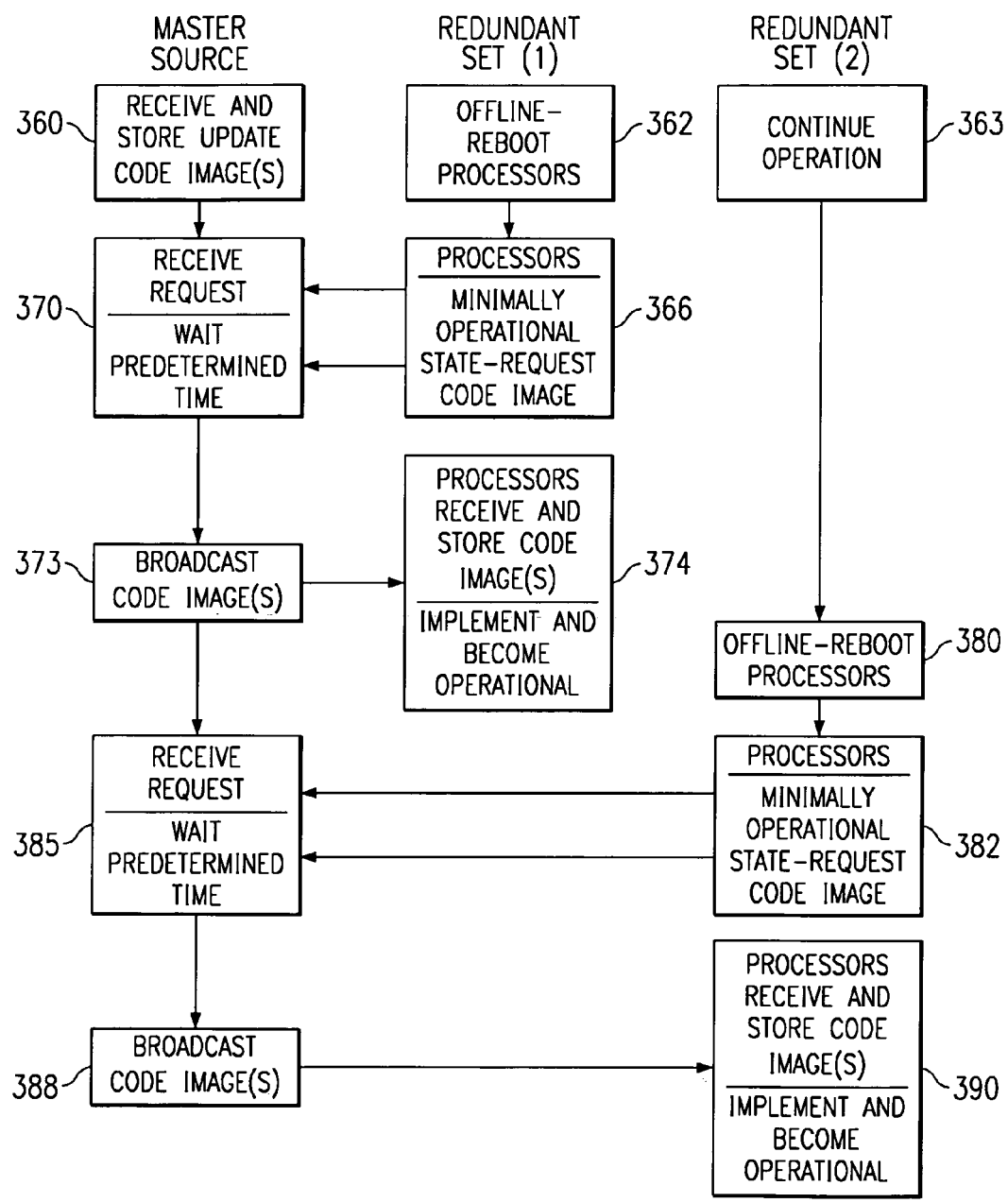
FIG. 6 is a flow chart depicting a computer implemented embodiment of a method for updating code images for a redundant system in accordance with the present invention.

Referring additionally to FIG. 6, in another aspect of the present invention, in which the processors are provided for modules of a redundant system, such as an automated data storage library 10, having at least two sets of modules, the master source receives and stores the update code image(s) in step 360. A first set of the redundant modules is taken offline and rebooted in step 362, while at least a second set continues in operation in step 363. As an example, work processor 52 may comprise the master source, and the modules of the high availability frame 13 may be taken offline and rebooted, comprising processors 252, 255, 250, 259, and the processors associated with the data storage drives 15 in the frame. In step 363, the modules of the base frame 11 and extension frame 12 may continue operation, comprising processors 52, 55, 50, 155, 59, and the processors associated with the data storage drives 15 in the frames. In one embodiment, the master source 52 may send messages to cause the processor to reboot and run the boot code as though the module is being reset after a power-on or is being reinitialized as discussed above, and, in another embodiment, the modules are rebooted by an operator or an external command.

In step 366, the boot code is executed, such that the processors of the modules reach the minimally operational state and request the code image from the network. The master source 52, upon receiving a code image request in step 370, waits a predetermined time period, the predetermined time period allowing any additional processor of the first set of modules to reach the minimally operational state and request code images. The master source 52, upon completion of the predetermined time period, in step 373, broadcasts the code image(s) on the network, such that the processors requesting the code image(s) each receive the code image(s) in step 374, store the correct code image, and execute the code image and become fully operational.

Then, in step 380, a remaining second set of redundant modules is rebooted, as above. For example, the modules of the base frame 11 and extension frame 12 may be taken offline and rebooted, comprising processors 55, 50, 155, 59, and the processors associated with the data storage drives 15 in the frames. Master source 52, or 252, if redundant, remains operational, as do the modules that became operational in step 374. Upon being rebooted, the processors 105 of the remaining set of redundant modules, in step 382, reach the minimally operational state and request the code image from the network. The master source 52, in step 385, upon receiving a code image request, waits a predetermined time period, the predetermined time period allowing any additional processor of the second set to reach the minimally operational state and request a code image. In step 388, upon completion of the predetermined time period, the master source 52 broadcasts the code image(s) on the network. In step 390, the second redundant set of processors requesting the code image(s) each receive the code image(s), store the correct code image, and execute the code image and become fully operational. Steps 380–390 may be repeated for further sets of redundant modules.

In this manner, the code images for the entire redundant system have been updated without requiring that the entire system be interrupted.

As the result, the present invention eliminates the need to maintain and update code levels on individual processors.

While the preferred embodiments of the present invention have been illustrated in detail, it should be apparent that modifications and adaptations to those embodiments may occur to one skilled in the art without departing from the scope of the present invention as set forth in the following claims.

I claim:

1. A multi-node network of processors, comprising:
   a network;
   a plurality of processors coupled in said network, each of said processors comprising a non-volatile memory configured to store program code of a minimally operational state, said program code comprising only boot program code, said minimally operational state absent an operating code image required to become fully operational, said boot program code sufficient to operate said processor to provide a code image request; and comprising a volatile memory configured to store said operating code image, said operating code image configured to place said processor in a fully operational state; said processors, when in said minimally operational state, employing said boot program code to request said operating code image from said network by means of said code image request; and a master source coupled in said network, said master source configured to provide at least said operating code image for broadcasting said operating code image on said network, said master source, upon receiving said code image request, waiting a predetermined time period, said predetermined time period allowing any additional said processor to reach said minimally operational state, and, upon completion of said predetermined time period, broadcasting said operating code image on said network.

2. The multi-node network of processors of claim 1, wherein said processors, additionally, upon said broadcast of said operating code image, employ said boot program code to receive and implement said operating code image only if said processor is in said minimally operational state.

3. The multi-node network of processors of claim 1, wherein said master source provides one said operating code image for any said code image request.

4. The multi-node network of processors of claim 3, wherein ones of said processors implement different said operating code images, wherein said one master source operating code image comprises a combination of said different operating code images, and wherein said processors employ said boot program code additionally to select, store in said volatile memory, and implement one of said combination of different operating code images.

5. The multi-node network of processors of claim 1, wherein said master source is configured to provide a plurality of different said operating code images, wherein said processor requesting said operating code image requests one of said different operating code images, wherein said master source is configured to broadcast said requested one of said different operating code images, and wherein said processors employ said boot program code additionally to determine whether said broadcast operating code image is correct for said processor, and to select and store in said volatile memory, said broadcast operating code image for implementation if said determination determines that said operating code image is correct for said processor.

6. A method for providing a code image for processing nodes of a multi-node network of processors, comprising the steps of:

at least one said processor, comprising a node of said network, in a minimally operational state employing program code comprising only boot program code, said boot program code sufficient to provide a code image request, requesting an operating code image from said network by means of said code image request; said minimally operational state absent said operating code image required to become fully operational;

a master source, upon receiving said code image request, waiting a predetermined time period, said predetermined time period allowing any additional said processor to reach said minimally operational state; and said master source, upon completion of said predetermined time period, broadcasting said operating code image on said network.

7. The method of claim 6, additionally comprising the step of, said processors, upon said broadcast of said operating code image, receiving and implementing said operating code image only if said processor is in said minimally operational state.

8. The method of claim 6, wherein one said operating code image is provided by said master source for any said code image request.

9. The method of claim 8, wherein ones of said processors implement different said operating code images, wherein said one operating code image provided by said master source comprises a combination of said different operating code images, and wherein said method additionally comprises the step of, said processors employing said boot program code, selecting and implementing one of said combination of different operating code images.

10. The method of claim 6, wherein said master source is configured to provide a plurality of different said operating code images, wherein said step of said processor requesting said code image comprises employing said boot program code, requesting one of said different operating code images, wherein said step of said master source broadcasting said code image comprises broadcasting said requested one of said different operating code images, and wherein said method additionally comprises the step of, a receiving processor employing said boot program code, determining whether said broadcast operating code image is correct for said processor, and selecting said operating code image for implementation if said determination step determines that said operating code image is correct for said processor.

11. For a multi-node network of processors, said network having a master source coupled in said network, said master source having a code image for broadcasting on said network, said master source, upon receiving a code image request, waiting a predetermined time period, and, upon completion of said predetermined time period, broadcasting said requested code image on said network, a processor comprising:

a processor interface coupling said processor in said network;

a nonvolatile memory for storing program code providing a minimally operational state of said processor, said program code comprising only boot program code, said minimally operational state absent an operating code image required to become fully operational, said boot program code sufficient to operate said processor to provide a code image request;

a processor memory capable of storing said operating code image providing a fully operational state of said processor; and a processing unit coupled to said non-volatile memory, said processor memory and said processor interface, said processing unit, when in said minimally operational state provided by said nonvolatile memory, employing said boot program code to request said operating code image from said network, via said processor interface by means of said code image request.

12. The processor for a multi-node network of processors of claim 11, wherein said processing unit, additionally, upon said broadcast of said code image by said master source, employs said boot program code to receive and store said operating code image in said processor memory, and implement said operating code image, only if said processing unit is in said minimally operational state.

13. The processor for a multi-node network of processors of claim 11, wherein said master source provides one said code image for any said code image request, said one code image comprising a combination of different operating code images, and wherein ones of said processors implement different said operating code images, said processing unit additionally employing said boot program code, selecting, storing and implementing one of said combination of different code images.

14. The processor of a multi-node network of processors of claim 11, wherein said master source comprises a plurality of different said operating code images, said master source broadcasting said requested one of said different operating code images, and wherein said processor requesting said operating code image requests one of said different operating code images, said processor employs said boot program code additionally to determine whether said broadcast code image is correct for said processor, and to select and store in said processor memory said broadcast operating code image for implementation if said determination determines that said operating code image is correct for said processor.

15. A multi-node network of processors, comprising:
a network;
a first set of redundant processors coupled in said network, said processors having a minimally operational state employing program code comprising only boot program code, said boot program code sufficient to provide a code image request, said minimally operational state absent an operating code image required to become fully operational; and having a fully operational state employing an operating code image; said processors, when in said minimally operational state, requesting said operating code image from said network by means of said code image request;

a second set of redundant processors coupled in said network, said processors having a minimally operational state employing program code comprising only boot program code, said boot program code sufficient to provide a code image request, and having a fully operational state employing an operating code image, said processors, when in said minimally operational state, requesting said operating code image from said network by means of said code image request; and a master source coupled in said network, said master source having at least said operating code image for broadcasting said operating code image on said network, said first set of redundant processors rebooted to said minimally operational state, said master source, upon receiving said code image request from one of said first set of redundant processors, waiting a predetermined time period, said predetermined time period allowing any additional said processor to reach said minimally operational state, and, upon completion of said predetermined time period, broadcasting said operating code image on said network, whereby said first set of redundant processors become fully operational; whereupon said second set of redundant processors are subsequently rebooted to said minimally operational state, said master source, upon receiving said code image request from one of said second set of redundant processors, waiting a predetermined time period, said predetermined time period allowing any additional said processor to reach said minimally operational state, and, upon completion of said predetermined time period, broadcasting said operating code image on said network, whereby said second set of redundant processors become fully operational.

* * * * *